J. Regester,
Hydrant,
№ 1,984, Reissued June 6, 1865.
Fig; 1.
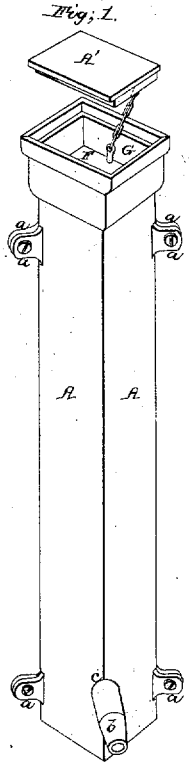
Fig; 4.
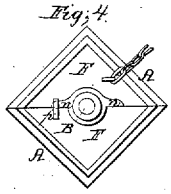
Fig; 5.
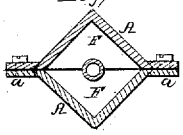
Fig; 6.
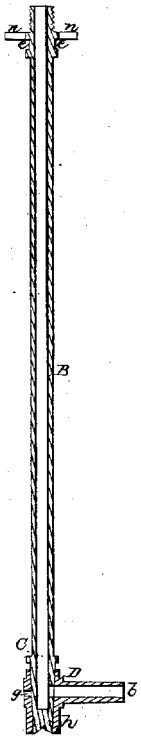
Fig; 2.
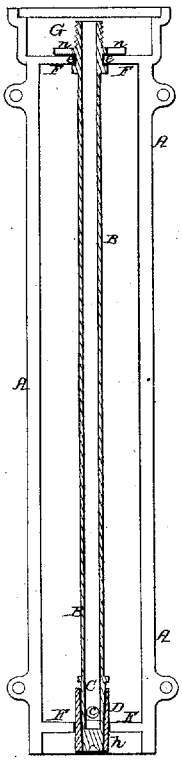
Fig; 3
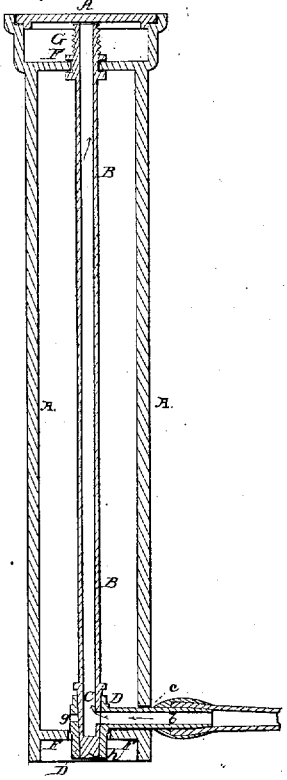
Witnesses;
R. J. Campbell
Geo. Schulze
Inventor;
Joshua Regester
by his Atty;
Mann, Fennell & Hammond
N. PETERS, PHOTO-LITHOGRAPHER, WASHINGTON, D. C.

UNITED STATES PATENT OFFICE.

JOSHUA REGESTER, OF BALTIMORE, MARYLAND.

IMPROVEMENT IN STREET-WASHERS.

Specification forming part of Letters Patent No. 32,893, dated July 23, 1861; Reissue No. 1,984, dated June 6, 1865.

DIVISION NO. 2.

*To all whom it may concern:*

Be it known that I, JUSHUA REGESTER, of the city of Baltimore and State of Maryland, have invented a new and useful Street-Washer; and I do hereby declare that the following is a full, clear, and exact description of that part of my invention which relates to Division No. 2, reference being had to the accompanying drawings, making a part of this specification, in which—

Figure 1 is a perspective view of the street-washer complete. Fig. 2 shows one of the sections of the case and a diametrical section through the contrivance for supplying water. Fig. 3 is a vertical section through both sections of the case and its inclosed stop-cock. Fig. 4 is a top view of the street-washer with its cover removed. Fig. 5 is a horizontal section through the case surrounding the stop-cock. Fig. 6 is a diametrical section through a stop-cock and its discharge-pipe.

Similar letters of reference indicate corresponding parts in the several figures.

The object of this part of my invention is to construct a metallic stop-cock case for street-washers in sections or divisions in such manner that in the act of putting the sections together to form the case the stop-cock and its attachments can be centered and confined within the case in a proper position for use, leaving the stem or tube of the cock projecting through the case a sufficient distance to admit of the attachment of the water-pipe to it, as will be hereinafter described.

Another object of my invention is to provide for the escape of water from the discharge-pipe of the cock when the supply of water into this pipe from the service-pipe is cut off, as will be hereinafter described.

To enable others skilled in the art to understand my invention, I will describe its construction and operation.

In the accompanying drawings, A A represent two corresponding sections of a metallic case which is adapted for closing within it a stop-cock, D, and a rod, B, for opening or closing the cock. These sections are cast with shoulders at F F near the top and bottom of the case, which shoulders form collars for encircling and keeping in place the rod B and the stop-cock D when the two sections of the case are secured together.

Just above the upper collar, F, is a chamber, G, which is covered by means of a lid, A′, that fits into the upper end of the case flush with this end; and just above the lower collar, F, a hole, *c*, is made through the case to receive through it the extended tube *b* of the stop-cock, as shown in Figs. 2 and 3. Lugs *a a* are cast on the two sections A A of the case to receive bolts or screws through them by which to secure the two sections of the case together. Within this sectional case I apply a stop-stock in such manner that in the act of putting together the sections of the case the stop-cock, together with its discharging-tube and the contrivance for regulating the motion of this tube, are all properly adjusted and secured in place ready for use, leaving nothing further to be done than the attachment of the cock D to the service-pipe leading from a main by ordinary plumbing. To effect this the cylinder of the stop-cock is extended below the stem *b* of the cock and received by the collar F at the bottom of the case A A. The stem *b* of the cock is received by the hole *c* through the case, and the upper end of the pipe B is provided with an annular groove, *e*, which receives the collar F at the upper end of the case, as shown in Figs. 2 and 3.

The discharge-pipe and its cock are adjusted in position upon that section of the case which has the opening *c* through it for the stem *b* of the cock, after which the other section is adjusted in its place and the two sections secured together. The upper extremity of the pipe B has a male screw or hose-coupling of any suitable description applied to it for receiving a hose for washing the pavement, cleaning windows, or sprinkling the street. The upper end of the pipe B is also provided with catches *n n*, and a stop-pin, *p*, is applied to the top of the collar F, against which one or the other of the catches strike in turning the pipe B half round and back again. A waste-hole, *g*, is drilled through the cock-cylinder D diametrically opposite the stem *b* of the cock, for the purpose of allowing the water in the tube B to run out when turned off to prevent freezing. The travel of the catches is so adjusted as to give but a half-turn, which will either turn the water on and the waste-water off, or vice versa. In the position shown in the drawings the water is turned on, flowing in the direction indicated by the arrows, and the waste turned off.

Having thus described my invention, what I claim as new, and desire to secure by Letters Patent, is—

1. A metallic sectional stop-cock case which is so constructed that in the act of securing the sections together the stop-cock and its appendages are confined within said case in a permanent position, substantially as described.

2. Centering the stop-cock at its lower end by by means of a collar-bearing, F, or its equivalent, in combination with a metallic case, substantially as described.

3. The combination of a turning discharge-pipe, B, with a stop-cock and a metallic case, which is constructed with an upper and a lower bearing, F, substantially as described.

Witnesses: JOSHUA REGESTER.
JAMES FLYNN,
SAML. W. REGESTER.